TELEVISION RECEIVER TUNER CHANNEL INDICATOR

Filed May 23, 1960 2 Sheets-Sheet 1

INVENTOR:
Bryce C. Bateman
By Smyth, Roston & Pavitt
Attorneys.

TELEVISION RECEIVER TUNER CHANNEL INDICATOR

Filed May 23, 1960

INVENTOR:
Bryce C. Bateman
By Smyth, Roston & Pavitt
Attorneys.

United States Patent Office 3,264,625
Patented August 2, 1966

3,264,625

TELEVISION RECEIVER TUNER CHANNEL INDICATOR

Bryce C. Bateman, Northridge, Calif., assignor to Packard-Bell Electronics Corporation, Los Angeles, Calif., a corporation of California Filed May 23, 1960, Ser. No. 30,872
1 Claim. (Cl. 340—202)

This invention relates to television receivers and, more particularly, to a channel selector unit or control panel for television receivers or for remote control units associted with television receivers.

Conventional channel selectors utilize a control knob carrying the channel designations. When the control knob is rotated to adjust the tuner for a different channel, a stationary pointer indicates the channel designation or number on the knob. For such arrangements, the channel designation is not readily visible from a distance. In particular, a viewer seated across the room from the television receiver cannot determine the selected channel designation. Optical systems have been developed for projecting an image of the selected channel designation to facilitate such remote visual determination of the selected channel, but such systems have generally been unsatisfactory. The systems are unsatisfactory because of the lack of sharpness of the image, the complexity and cost of the optical system and the lack of contrast between the image and the surrounding medium. In short, these systems have not provided a relatively simple and economical arrangement or provided a sufficiently discernible image for remote determination of the selected channel.

In a specific illustrative embodiment of this invention, a channel selector unit is provided which provides a clear, sharp image of the selected channel designation. The selector unit is, moreover, inexpensive and particularly suitable for mass production techniques. The channel selector unit provides the different channel designations at different predetermined positions on a sheet of transparent acrylic plastic at the front of the unit. The position of the designation as well as its configuration, accordingly, indicates the identity of the designation to the viewer.

The acrylic plastic sheet is colored to conform with the overall color design of the television receiver and to provide a color contrast for the illuminated designations projected thereon. The acrylic plastic sheet is backed by a sheet of translucent material such as vellum which functions as a light diffuser for a projected beam. The vellum is in turn backed by a thin transparent film lithographed black except for the channel designations. The lithographed film functions as a designation image forming mask for illuminating the sheet of vellum.

The lithographed film is backed by a metal assembly unit which supports a multibulb light source. The source includes one bulb for each channel designation and a box having a coordinate array of partitions for isolating the bulbs. The light from each bulb can only pass through an associated transparent channel designation on the lithographed film or masking member to the vellum and acrylic plastic sheet. The bulbs are selectively energized in accordance with the selected channel designation by a rotary selector switch, or commutator member, mechanically coupled to the channel selector shaft of the tuner. The channel selector shaft and the fine tuning shaft of the tuner extend at one end through the various laminated layers forming the panel of the channel selector unit and at the other end, the selector shaft is coupled to the rotary selector switch.

Further advantages and features of this invention will become apparent upon consideration of the following description when read in conjunction with the drawing wherein.

Figure 1:
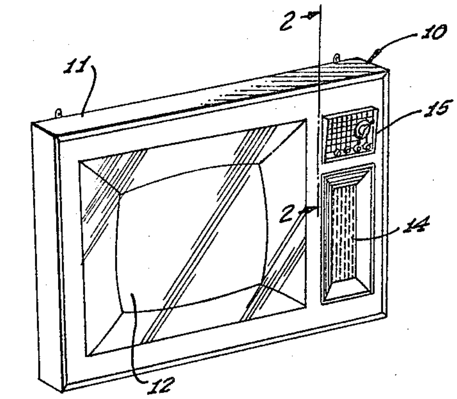
FIGURE 1 is a pictorial view of a television receiver including the channel selector unit of this invention.
Figures 4, 5, 6:
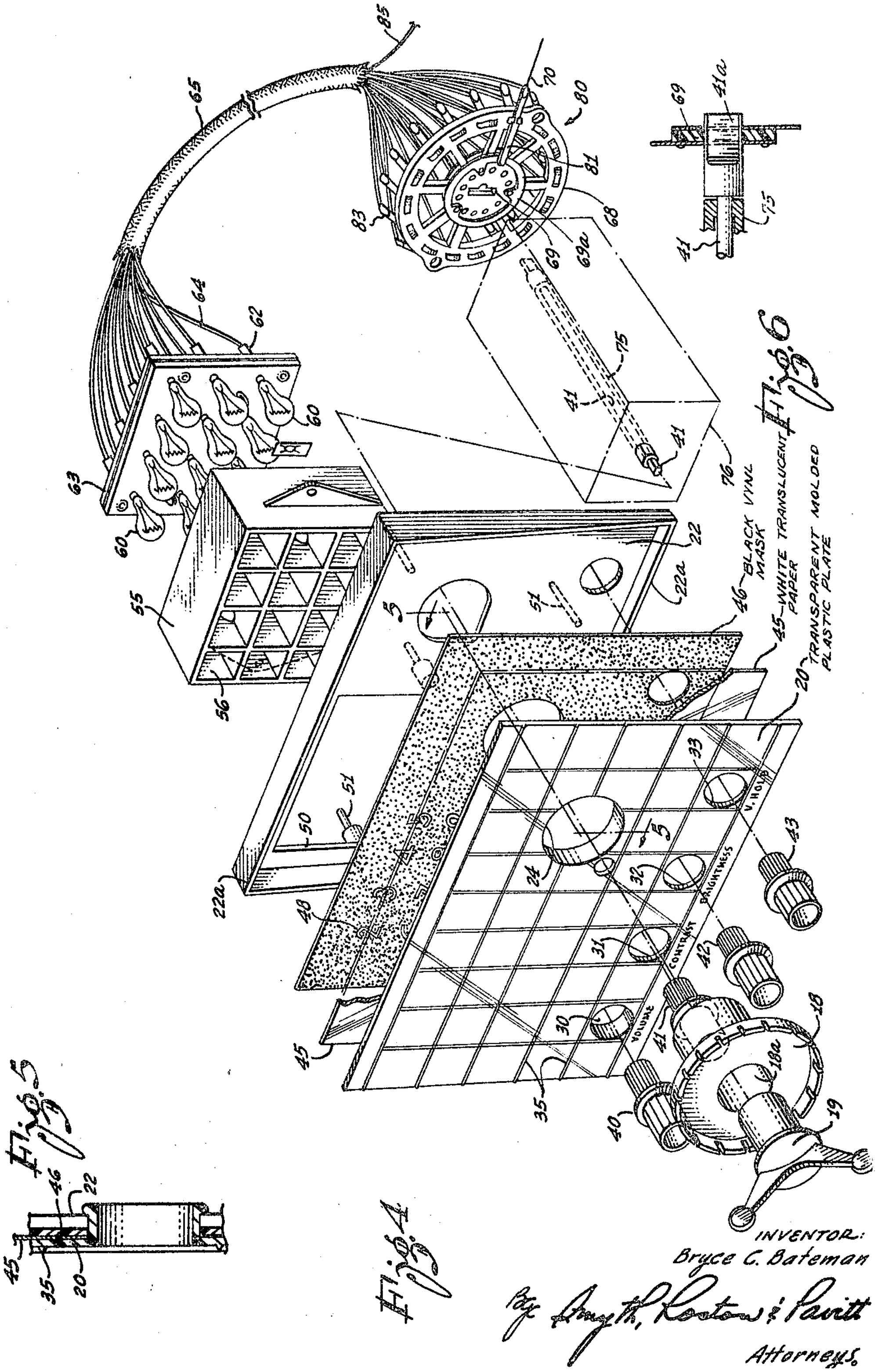
FIGURE 4 is an exploded pictorial view of the channel selector unit of this invention.
FIGURE 5 is a partial sectional view taken along lines 5—5 of FIGURE 4 illustrating the lamination of the various layers forming the panel of the channel selector unit.
FIGURE 6 is a sectional view through the tuner shafts illustrating the coupling to the commutator utilized in the channel selector unit of this invention.

Referring first to FIGURE 1, a television receiver 10 is depicted which includes a rectangularly shaped enclosure 11. The front of a receiving tube 12, of a speaker baffle 14 and of a channel selector unit 15 of this invention are on one side of the enclosure 11. The baffle 14 and the channel selector unit 15 may be positioned on one side of the face of the tube 12 at the front of the enclosure 11. The channel selector unit 15 is utilized to select one of a number of television channels and includes a number of control knobs 40 to 43, depicted in FIGURES 3 and 4, for adjusting the video image provided on the face of the receiving tube 12. These controls may be conventional and as indicated by the designations in FIGURE 3, are utilized to adjust the volume, contrast, brightness and vertical hold.

The channel selector unit 15 includes a transparent plate 20 for providing a visual indication of the selected channel. The indication is readily discernible at a distance from the televsion receiver 11. For example, the channel designation provided on the plate 20 is readily discernible at a distance of 15 to 20 feet which is a typical television viewing distance. As shown particularly in FIGURES 4 and 5, the channel selector unit 15 includes a number of different layers which are laminated or sandwiched to form the front panel of the unit 15. The plate 20 which is made of a transparent material such as a molded acrylic plastic, or Plexiglas, forms the face or viewed surface of the front panel of the unit 15. The Plexiglas plate 20 may be colored to function as a suitable contrast medium upon which the illuminated channel designations are projected. Illustratively, the transparent plate 20 may be amber colored. The plate 20 has a number of ridges 35 which form a rectangular array for defining the positions or areas upon which the channel designations are projected.

Figures 2, 3:
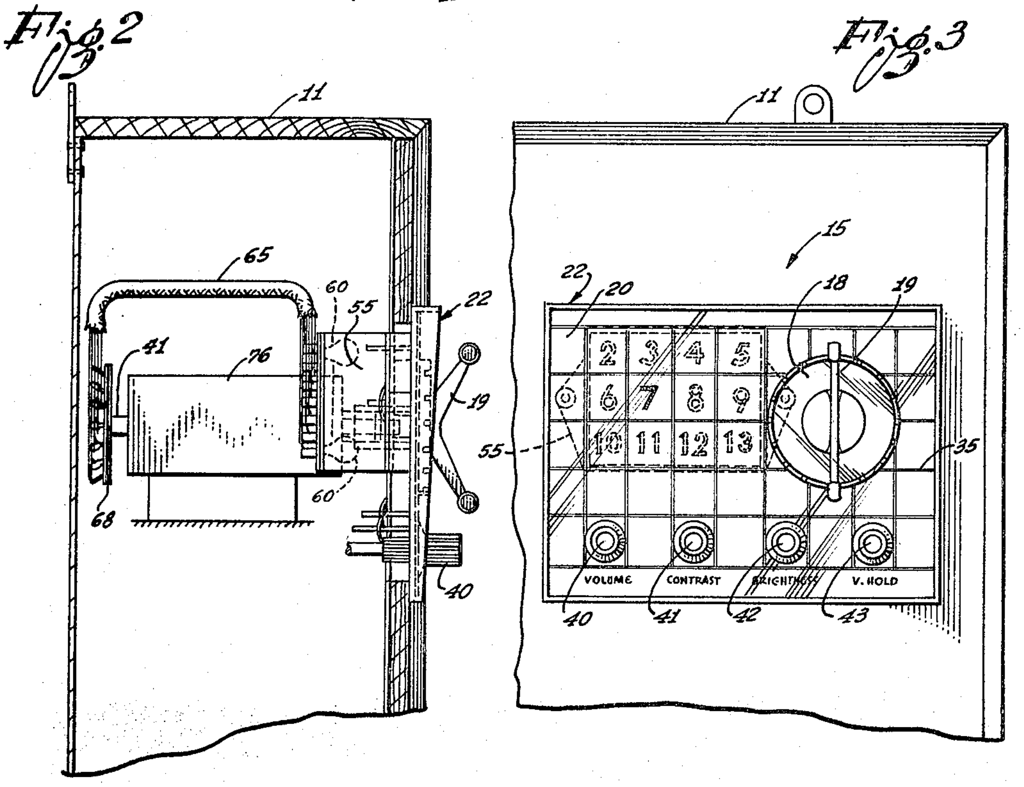
FIGURE 2 is a partial sectional view taken along lines 2—2 of FIGURE 1 showing a side view of the channel selector unit of this invention.
FIGURE 3 is an enlarged front view of the portion of the television receiver illustrating the channel selector unit of this invention.

As illustrated particularly in FIGURE 3, each of the 12 channel numbers, or designations is provided at a different rectangular area of the panel 20 upon which it is projected. The viewer, accordingly, can readily determine the selected channel designation not only by the discernible number but also by the position of the number on the dial plate 20.

The plate 20 is backed by a thin sheet of white translucent paper or vellum 45 which functions as a light diffuser. The vellum 45 provides for illuminated numbers in which the light intensity is the same in the various portions of the number. If the vellum 45 were not utilized, some portions of each channel number on the plate 20 would be brighter than other portions of the number.

The sheet of vellum or diffuser 45 is backed by a masking member 46 which may be a sheet of thin transparent film lithographed black except for the channel numbers 48. The numbers 48 accordingly are effectively transparent apertures in the member 46. The masking member 46 may also be made of black vinyl with the numbers 48 being transparent portions or actual apertures in the vinyl. The plate 20, together with the sheet of vellum 45 and the masking member 46, are supported by a metal supporting member 22 which may, illustratively, be made of zinc having a metalized gold bezel **22*a* extending forward in front of the dial plate 20. The bezel 22*a* frames the plate 20 at the front of the unit 15. The member 22 supports a box 55, which may be made of a polystyrene plastic and which has 12 square compartments 56. Each of the compartments 56 is open at both ends and encloses a small lamp 60. The lamps or bulbs are supported on a double sheet 63 made of a plastic material such as a phenolic material. The bulbs 60 may each include two prongs which fit into sockets supported on the sheets 63. A number of terminals 64, individually associated with the bulbs 60, extend from the back of the sheets 63 and provide conections from a number of leads 64 to the bulb sockets. The terminals 64 may be folded over between the two sheets 63 of phenolic material so that the sandwiched sheets 63 serve to support the terminals in their respective positions. The entire sub-assembly, including the bulbs 60 and the sheets 63, is removable from the plastic box 55 being supported therein by two tri-mount resilient members 61. The members 61 fit into sockets, not shown, in the back of the box 55. These sockets may be at the intersection of cross members forming the enclosures 56. As indicated above, the enclosures 56 insure that the light from any one of the bulbs 60 is provided only through the associated channel number 48 of the mask 46. The box 55 fits through an opening 50 in the support member 22 and against the masking member 46. The selector unit 15 is, accordingly, quite compact because the plate 20, vellum 45 and members 46 and 22 are positioned against each other, and the box 55 is against the back of the masking member 46**.

The bulbs 60, which are positioned respectively in the enclosures 56 behind the 12 reference numbers 48 of the masking member 46, are selectively energized in accordance with the channel selection. A channel is selected by a channel selector knob 19 in front of the plate 20 mounted on a shaft 41 of the television tuner 76. The television tuner 76 may be conventional, and includes two concentric shafts 75 and 74 which respectively control the channel selection and fine tuning. A knob 18 at the front of the channel selector unit 15 fits into a hole **18*a* of the knob 18 and is coupled to the fine tuning shaft 75. Both of the knobs 18 and 19 are of compact and esthetic design because they are not utilized to provide an indication of the chanel designation. The shaft 41 passes through the television tuner 76, and has an extension 41*a* shown in FIGS. 6 and 4, of substantially rectangular cross-section which fits into a slot of a rotatable contact member 69. The member 69 is part of a commutator or selector switch 80 depicted particularly in FIGURE 4. The member 69 has a peripheral conductive ring 69*a* on each side for establishing a connection between a resilient terminal 81 and one of a number of terminals 83. An input lead 70 is connected to the terminal 81 for introducing a suitable potential for energizing the bulbs 60. Illustratively, the bulbs 60 may have a rating of 6.3 volts but the potential at the lead 70 may be somewhat smaller, illustratively at 5 volts. The utilization of a smaller potential provides for slightly less illumination from the bulbs 60** but materially increases their life. When 5 volts are utilized instead of 6.3 volts, the life expectancy is increased by apporximately 300 percent.

As indicated above, commutator 80 includes a number of terminals 83, one for each of the 12 bulbs 60 mounted on the plastic sheets 63. The terminals 83 are connected to the wires 64 which are enclosed in a cable 65. One of the terminals 83 is contacted by an extension on the ring **69*a* mounted on the back of the rotatable member 69. This extension, not shown in FIGURE 4, establishes a connection from only one of the terminals 83 through both rings 69*a* to the lead 70. A lead 85 which is connected into the cable 65 is multipled to one prong of each of the bulbs 60. The other prong of the bulbs 60 is individually connected by the leads 64 to the terminals 83**.

When the shaft 41 is rotated by the knob 19 to change the selected channel, the member 69 establishes an electrical connection from the leads 70, at a potential of plus 5 volts through the rings **69*a*, one of the terminals 83 and an associated lead 64, through a bulb 60 which corresponds with the selected channel of the lead 85 which may be at ground potential. In this manner, one of the bulbs 60 is energized in accordance with the channel selection. The light from the energized bulb 60, which is blocked on all sides by the sides of the enclosure 56 and at the back by the sheets 63, is provided through the associated channel number 48 on the masking member 46 and the vellum or diffused 45 to the Plexiglas plate 20. The channel designation on the plate 20 is quite sharp and clear and readily discernible from a distance and, moreover, the light intensity at the various portions of the designation is substantially the same due to the light diffusion by the sheet of vellum 45. The image of the designation on the plate 20 is quite sharp because the masking member 46 is positioned against the vellum 45**. The image is accordingly not projected and cannot become fuzzy.

The channel designation on the plate 20 is further readily identified by the position of the designation of the channel as each designation has a unique square formed by the ridges 35. In this manner, a channel selector unit 15 is provided which develops a clear image of the selected channel designation at a unique position on the panel 20.

Although this invention has been disclosed and illustrated with reference to particular applications, the principles involved are susceptible of numerous other applications which will be apparent to persons skilled in the art. For example, the principles of the invention may be utilized in any application where sharp, large indications are required. Illustratively, indications such as AM-FM Stereo, Monaural, Multiplex, etc., on high fidelity equipment may be provided under control of selector equipment. The invention is, therefore, to be limited only as indicated by the scope of the appended claims.

What is claimed is:

A channel selector unit for controlling the reception of a television receiver and for providing a visual indication of the selected channel, including an acrylic plastic transparent sheet having a coordinate array of ridges on one side of the sheet to define a number of designation areas, a sheet of translucent material against the other side of the acrylic plastic sheet for diffusing light provided thereto, a masking sheet member against said translucent sheet so that the translucent sheet is sandwiched between the masking sheet member and the transparent sheet, said masking sheet member having a plurality of differently shaped transparent designation areas each positioned opposite a different one of the designation areas of said transparent sheet to define individual illuminated designations in the different designation areas of the transparent sheet, a plurality of light sources each positioned adjacent a different one of the transparent designation areas of the masking member for providing illuminated designations on the designation area of the plastic sheet which is in front of the associated designation area of the masking member, a tuner for selecting a channel for reception, and switching means electrically connected to said light sources and mechanically connected to said tuner for selectively energizing said bulbs in accordance with the channel selected by said tuner, said tuner including a selector shaft mechanically coupled to said switching means on one side and extending on the other side through said masking member, said sheet of translucent material and said acrylic plastic sheet, said masking member and said sheet of translucent material and said acrylic plastic sheet each defining an opening through which the other side of the selector shaft extends.

References Cited by the Examiner

UNITED STATES PATENTS

| | | | |
|---|---|---|---|
| 1,108,999 | 9/1914 | Levison | 340—381 |
| 1,452,455 | 4/1923 | Bell | 340—382 |
| 1,912,263 | 5/1933 | Sonno | 340—202 |
| 2,522,098 | 9/1950 | Coste | 340—202 |
| 2,755,424 | 7/1956 | Papitto | 340—202 |
| 3,129,421 | 4/1964 | Freedman | 340—378 |

NEIL C. READ, *Primary Examiner.*

L. MILLER ANDRUS, THOMAS B. HABECKER, *Examiners.*